United States Patent Office 3,423,645
Patented Jan. 21, 1969

1

3,423,645
HERMETICALLY ENCLOSED GALVANIC
MICROELEMENT
Paul Ruetschi, Yverdon, Switzerland, assignor to
Leclanche S.A., Yverdon, Vaud, Switzerland, a
company of Switzerland
Filed June 27, 1966, Ser. No. 560,449
Claims priority, application Switzerland, June 29, 1965,
9,057/65
U.S. Cl. 317—230            6 Claims
Int. Cl. H01g 9/00

ABSTRACT OF THE DISCLOSURE

An electrochemical cell with alkaline electrolyte comprises hollow metallic members sealed with an intermediate insulative member forming a container. Porous separators soaked with electrolyte are located within the intermediate member and between the metallic members. Electrodes in the hollow metallic members contact the electrolyte and outer ends of the members are sealed thereby providing an hermetically sealed cell.

---

Figures 1, 2:
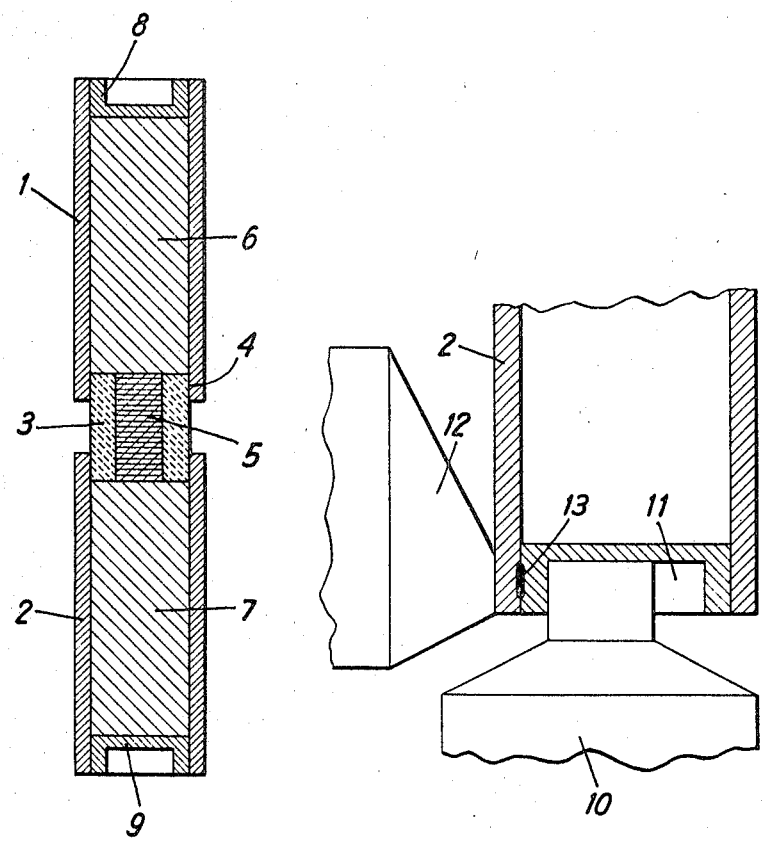

This invention relates to an hermetically sealed galvanic microelement for use with alkaline electrolytes.

Microelements using alkaline electrolytes are known wherein two metal cup housings are mechnically connected to each other with their open ends abutting, such connections being in the form of an elastic gasket ring made of natural or synthetic resins, and which are electrically insulated from each other. The gasket ring, when sealing the microelement, becomes squeezed between the rims of the two cups. The locking of the element and the sealing between the two electrodes is accomplished in one working path.

The synthetic resins to be used for the gasket ring must be completely inert against the electrolytes in the element. An appropriate choice in the sealing material becomes difficult for applications wherein corrosive solutions are used. Furthermore, it is required that the gasket ring rest completely flat on the metal parts. Small unevenness and discontinuities, which are always found on solid metal surfaces, must be filled out by the elastic sealing material. To eliminate this a clean, flat unoxidized metal surface is required since oxide films may produce porous spots which would allow the electrolyte to escape.

Alkaline electrolytes have excellent wetting and creep potential characteristics on metal surfaces. Because of this reason, it is extremely difficult to achieve complete hermetic sealing using organic synthetic sealing materials. This difficulty is manifed when making higher temperature seals from organic material since the sealing properties become inadequate.

To avoid these difficulties which are known to occur with elastic seals made of synthetic material, the use of ceramic joints between the metal parts to be insulated has become known. Metal-ceramic joints are widely used in electronics and electrical engineering applications. More specifically, they are used in the manufacture of electric bulbs, tubes of all descriptions, the hermetic sealing of semiconductors and for insulating switches. For the construction of element housings such type of joints have been suggested only very recently.

The first galvanic elements with such types of joints have been used in satellites, where a completely hermetic seal is an indispensable requirement. Ceramic seals for satellite elements consist basically of a ceramic ring where, on the external and internal cylinder areas, the metallic parts are soldered on. The external cylindrical area is connected with a housing proper, while the internal cylindrical area is soldered to a duct leading into the interior of the element. For small elements this internal duct consists of a wire, soldered into a ceramic element.

Constructions wherein the front surface of a ceramic disc is metallized have been suggested. The soldered connection to the cell case proper thereby encloses the solder connection to the wire which, being insulated, is introduced into the cell housing. In every case the element electrodes are positioned on the same frontal side of the ceramic ring or ceramic disc. When making ceramic-metal solder connections, very high temperatures must be used which are not resisted by the other components of the cell. Because of this, the ceramic-metal solder connection is separately made and becomes assembled at a later point of time, together with the other components of the elements such as electrodes, separators and electrolytes. Finally the element becomes hermetically sealed by welding. This welding, a metal-metal connection, must be accomplished in such a way that the components which are sensitive to heat do not become damaged. A lid may be positioned with the help of electric resistance welding. Small filling tubes for the electrolytes can be welded with arc welding under protective gas in the event sufficient protection is provided for the delicate parts by adequate cooling. The ceramic parts and the solder connection must be resistant against the alkaline electrolyte. Ceramic parts made of aluminum oxide and solders of nickel-gold or palladium alloys give the best results.

In the well known galvanic microelements either the positive or the negative electrode must be insulated from the internal wall of the element housing. Such insulation requires space and reduces the volume available for the electrodes, thereby affecting capacity. In these elements there exists the danger of short circuits between electrodes when dealing with the smallest type of element. Furthermore, there exists the separator area between the electrodes, in relation to the size of the known microelements of considerable dimension, which affects the space which is required.

The galvanic microelement according to this invention avoids such shortcomings. The microelement according to the present invention comprises two small metallic tubes which are axially soldered onto both ends of a ceramic ring which contains the separator. The metallic tubes containing the active substances are sealed at their free ends by lids which are welded on.

The invention will be more clearly understood from the following description of a specific embodiment of the invention together with the accompanying drawings, in which:

FIG. 1 is a longitudinal cross-sectional view of the element of the present invention; and FIG. 2 is an enlarged sectional view of one end of the present invention showing welding electrodes in place.

Referring now to the figures, in FIG. 1 two small metallic tubes 1 and 2 are attached to both ends of a ceramic ring 3 by soldering. The external cylindrical area of the ceramic ring 3 becomes metallized by first using fine mixtures of molybdenum and manganese, at temperatures of about 1500° C., in a hydrogen atmosphere. Before soldering the surfaces proper, a thin galvanic nickel layer may be applied. Then the small metal tubes are soldered to the ceramic ring with a gold-nickel alloy. A eutectic mixture of 17.5% nickel and 82.5% gold, at about 1000° C., is sufficiently liquid to achieve good wetting of the surfaces and a dense solder connection.

It is an advantage of the arrangement corresponding to this invention that only the external cylinder area of the ceramic ring has to become metallized, which results in a simplification of the manufacturing process. Both little metal tubes can be soldered on simultaneously. In another embodiment, the two little metal tubes can be provided with a flange which becomes soldered onto the opposed frontal area of the ceramic tube. According to this invention, in every case, the element electrodes are placed on the two opposite frontal sides of the ceramic tube. The two metal tubes 1 and 2, as it is well known to the art, must have thermal expansion coefficients which are adjusted to the behaviour of the ceramic piece. Nickel-iron alloys are best suited for such adjustment.

When the ceramic-metal connection is made, the parts are cooled and are ready for assembly of the elements. The interior of the ceramic ring is filled with a porous separator 5, soaked with electrolyte. A separator stopper can be made by stacking, rolling on, folding, agglomerating of fabrics, felt, membrane, cotton wool and paper. Suitable materials are nylon, Teflon, Dynel, cellophane, cotton wool and other fibrous products which are resistant to electrolytes. An inorganic separator made of porous glass, ceramic or stable metal oxide can be used whereby the element becomes completely free of organic material. The separator should be as porous as possible and produce a small electrical resistance, but should not include any metallic contact between both electrodes.

After inserting the separator, electrodes 6 and 7 are introduced from both sides into the little tubes. The active substances, in the form of powdered mixtures, are inserted into the small tubes. With adequate press molds, pills in rod form can be prepared which can be easily introduced into the little tubes.

The manufacture of mercury oxide-cadmium electrodes is as follows. The mercury oxide electrodes are formed from a mixture of 80–95% mercury oxide, 2.5 to 10% graphite and 2.5 to 10% gold powder in press molds, resulting in a pill in the form of a rod, using a pressure of 200 to 2000 kg./cm.$^2$. The diameter of the pill is made in such a way that it fits perfectly into the corresponding metallic tube. The negative electrode is compressed at 400–800 kg./cm.$^2$, from a mixture of 75 to 92% cadmium oxide, 5 to 10% carbonyl nickel powder, 0–5% graphite, and 3–10% mercury oxide and copper oxide, and then electrochemically formed in an alkaline solution at 2–15 ma./cm.$^2$. During this formation the metal oxides become reduced to metals, the latter becoming alloyed. The reduced, metallic pill is then introduced into the corresponding little metal tube.

After adding the desired amount of electrolyte in the form of lithium hydroxide, sodium hydroxide or potassium hydroxide, the element is sealed with two lids 8 and 9. The lids, as shown in FIG. 2, are then connected hermetically with the little tubes by electrical resistance seam welding. A welding electrode 10 is introduced into indentation 11 of the respective lid and a second welding electrode 12 placed on the outer periphery of tube 2. The welding seam is made with welding impulses, following each other with short time differences in such a way that the successive welds overlap. It is possible to use for welding of very small elements a single condensator discharge, so that the welding time can be reduced to 1–10 ms. It should be emphasized that any welding procedures can be used which will allow for very exact pin pointing of the heat at the point of welding if required, thereby not causing damage to the heat sensitive parts of the element such as the electrolyte, separator and electrodes.

Galvanic elements, manufactured according to this invention, are hermetically sealed. Neither gases nor electrolyte can escape, so that no danger of corrosion exists for the surrounding parts. Consequently, such elements can be inserted without any risk of disturbing delicate electronic arrangements. They can also be imbedded into biological substances.

Due to the novel, geometrical arrangement of the ceramic joint between the electrodes, the two electrodes are placed on opposing frontal sides of the ceramic ring 3. It is further an advantage to use a housing which is open on both sides. In this way the two electrodes can be introduced, through the corresponding openings, eliminating danger of a short circuit. All non-conducting parts are together and their volume can be reduced to a minimum. The area between the two electrodes is very small, and because of the small size of the separator, space can be saved.

The arrangement, according to the present invention, permits the manufacture of extremely small elements, including diameters of less than 2 mm. and lengths of less than 3 mm. With known arrangements, the manufacture of such very small microelements was impossible or the elements had an extremely small capacity.

The embodiment of the invention particularly described is presented merely as an example of how the invention may be applied. Other embodiments, forms and modifications of the invention, coming within the proper scope of the appended claims, will of course readily suggest themselves to those skilled in the art.

What is claimed is:

1. An hermetically enclosed galvanic microelement, comprising, at least two hollow cylindrical metallic tubes disposed along the same longitudinal axis with their adjacent ends spaced apart; a cylindrical ceramic ring member disposed coaxially with respect to said cylindrical tubes, the ends of said tubes being soldered to said ceramic ring, said soldered connection forming an hermetic seal, said ring having a longitudinal bore therethrough; a cylindrical separator member substantially occupying said bore in said ring, electrochemically active materials disposed within said tubes; and lid members being welded to the most distant opposing ends of each of said tubes, said welds providing an hermetic seal.

2. An hermetically enclosed galvanic microelement, comprising, at least two hollow cylindrical metallic tubes disposed along the same longitudinal axis with their adjacent ends spaced apart; a cylindrical ceramic ring member disposed coaxially with respect to said cylindrical tubes and having a portion of its body at each end thereof extending into a portion of each of said tubes, said ring having a longitudinal bore therethrough, said ring being soldered at the areas on its outer periphery in contact with said tubes, said soldered connection forming an hermetic seal; a separator member having a cylindrical shape and disposed to substantially occupy the bore in said ring, electrochemically active materials disposed within said tubes; and cylindrical lid members having an outside diameter substantially equal to the inside diameters of said tubes; said lid members being welded flush with respect to the most distant opposing ends of each of said tubes, said welds providing an hermetic seal.

3. An hermetically enclosed galvanic microelement according to claim 2, wherein a first tube comprises a positive electrode, said first tube containing mercury oxide, and a second tube comprises a negative electrode containing cadmium.

4. An hermetically enclosed galvanic microelement according to claim 2, wherein said electrochemically active material in one of said tubes is a heavy metal oxide, and the electrochemically active material in the other tube is a metal sponge.

5. An hermetically enclosed galvanic microelement according to claim 2, wherein said element comprises at least one alkaline electrolyte.

6. A method of manufacturing hermetically enclosed galvanic microelements, comprising the steps of axially positioning two metallic tubes with a ceramic ring between them, soldering portions of said tubes to said ring, inserting a separating member into said ceramic ring, filling said tubes with electrochemically active materials, sealing the open ends of said tubes by welding, thereby effecting an hermetic seal.

References Cited

UNITED STATES PATENTS

| | | | |
|---|---|---|---|
| 673,953 | 5/1901 | Hildburger | 317—233 |
| 1,473,883 | 11/1933 | Slepian | 317—231 |
| 2,644,902 | 7/1953 | Hardway | 317—230 |
| 3,143,691 | 8/1964 | Hurd | 317—231 |
| 3,275,903 | 9/1966 | Banewicz et al. | 317—230 |

JAMES D. KALLAM, *Primary Examiner.*

U.S. Cl. X.R.

29—570; 317—233